United States Patent [19]
Ichikawa

[11] Patent Number: 5,872,846
[45] Date of Patent: Feb. 16, 1999

[54] SYSTEM AND METHOD FOR PROVIDING SECURITY IN DATA COMMUNICATION SYSTEMS

[75] Inventor: Bryan K. Ichikawa, Monument, Colo.

[73] Assignee: MCI Communications Corporation, Washington, D.C.

[21] Appl. No.: 743,786

[22] Filed: Nov. 7, 1996

[51] Int. Cl.$^6$ ............................................... H04K 1/00
[52] U.S. Cl. ............................................... 380/23; 380/25
[58] Field of Search ........................................... 380/23, 25

[56] References Cited

U.S. PATENT DOCUMENTS

| 4,885,777 | 12/1989 | Takaragi et al. | 380/30 |
| 4,908,861 | 3/1990 | Brachtl et al. | 380/25 |
| 4,924,513 | 5/1990 | Herbison et al. | 380/25 |
| 5,450,493 | 9/1995 | Maher | 380/30 |
| 5,539,828 | 7/1996 | Davis | 380/50 |
| 5,588,061 | 12/1996 | Ganesan et al. | 380/30 |
| 5,621,796 | 4/1997 | Davis et al. | 380/24 |

OTHER PUBLICATIONS

Denning, Dorothy E. R., *Cryptography and Data Security: Combining Block Ciphers,* Ch. 15, 1982, Reading, MA:Addison–Wesley, reprinted 1983, pp. 357–358.

Denning, Dorothy E. R., *Cryptography and Data Security*, 1982, Reading, MA: Addison–Wesley, reprinted 1983, pp. 10–15 & 108–109.

*Primary Examiner*—David Cain

[57] ABSTRACT

A system and method for providing security in data communication systems where multiple users are coupled to a common receiving system. The data is encrypted or otherwise encoded by a sender using a key. The encrypted data is then scrambled or otherwise encoded, and transmitted by the sender. The transmitted data is received at a receiver where it is descrambled or otherwise decoded. An authorized user decrypts or otherwise decodes the descrambled data using a key to retrieve clear data. The key itself is encrypted by the sender using an asymmetric encryption algorithm, and is then transmitted by the sender. The authorized user decrypts the encrypted key using the asymmetric encryption algorithm, and uses the key to decrypt the encrypted data.

22 Claims, 8 Drawing Sheets

SYSTEM AND METHOD FOR PROVIDING SECURITY IN DATA COMMUNICATION SYSTEMS

BACKGROUND OF THE INVENTION

1. Field of the Invention

This invention relates generally to security in data communication systems, and more specifically to a system and a method for providing security in data communication systems where multiple users are coupled to a common receiving system.

2. Related Art

In any data transmission system, security is a major concern. The sender of data wants to ensure that only authorized users may gain access to the data, but not unauthorized users. In general, where there is only one user connected to a receiver, such as in a typical Direct Broadcast Satellite (DBS) system used for television services, a method known as Conditional Access is used to provide the user with the data. Conditional Access is a method for providing authorized reception of DBS transmissions.

In a DBS transmission system, a service provider uses a Broadcast Operation Center to provide the transmission. For example, suppose a movie or other program is to be transmitted to a customer. According to the Conditional Access method, at the Broadcast Operation Center, the data representing the movie is scrambled and transmitted via satellite. The transmission is performed with an uplink from the Broadcast Operation Center to a satellite and then to customers. The downlink indiscriminately covers a wide geographical area known as a footprint. Many customers within the footprint will be able to receive the transmission, but only those customers who have been authorized by the DBS service provider (i.e., those customers who have ordered the movie) will be able to descramble the signal. To receive and descramble the signal, a customer uses a satellite receiver dish and a decoder. The decoder contains the algorithms needed to descramble the signal, but will require certain data keys or additional algorithms to do so. These are provided by the DBS service provider, either on demand for transmissions such as pay-per-view movie, or on a subscriber basis for transmissions such as a movie channel.

In the example of a DBS transmission, the transmission signal is in the MPEG-2 format. MPEG-2 transmits several types of messages. One of these types is called the Entitlement Control Message. The Entitlement Control Message describes the content of the transmission, such as identifying the movie, and is intended for all service subscribers. The subscriber uses the Entitlement Control Message to identify which transmission they are to receive. Another type of message is called the Entitlement Management Message. The Entitlement Management Message describes the permission, or the Conditional Access method, and is intended for authorized recipients only. Another message stream is the content itself (i.e., the scrambled movie).

For example, the Broadcast Operation Center sends a transmission which the Entitlement Control Message declares it to be a pay-per-view movie and a subscriber needs permission #999 to view it. The subscriber orders this movie and receives permission #999. This may be done over phone lines, as is the case for many current DBS systems. The Entitlement Management Message is then used to validate the permission and to provide the keys or algorithms needed to descramble the content of the message.

SUMMARY OF THE INVENTION

The present invention is directed toward a system and a method for providing security in a data communication system. According to the invention, data is transmitted by a sender to an authorized user coupled to a receiver while ensuring that the data remains unavailable to other users who are coupled to the same receiver. According to one embodiment of the invention, the data is encrypted by the sender using a key. The encrypted data is then scrambled and transmitted by the sender. In alternative embodiments of the invention, other encoding schemes can be utilized.

After the data is scrambled, it is transmitted to a receiver which receives the data and descrambles it. All users who are coupled to the receiver will have access to the descrambled data, but the data is unreadable because it is encrypted. Only the authorized user with a proper key may decrypt the encrypted data to obtain clear data.

In the present invention, the method of encrypting the data and thereafter scrambling the encrypted data provides two levels of security. A third level of security can be afforded by providing authorized users with the proper key. This is done by another encryption process. The sender encrypts the key itself, and transmits the key to the receiver. The key may be transmitted by the sender using the same transmission medium by which the data is transmitted, or it may be transmitted using a different transmission medium. For instance, if the data is transmitted by a landline link, the key may be transmitted by a satellite link. At the receiver end, the authorized end user decrypts the key which is then used to decrypt the encrypted data.

An advantage of the invention is that the data can be sent by the sender to the authorized user coupled to the receiver while ensuring that the data remains unavailable to the other users who are also coupled to the same receiver but are not authorized to receive the data.

A further advantage of the invention is that an additional level of security is provided by providing the authorized user with the encrypted key. This additional level of security is provided in a simple and cost effective way which do not require any significant additional hardware for implementation.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION OF THE EMBODIMENTS

1. Overview and Discussion of the Invention

The present invention is directed toward a system and a method for providing security in data communication systems. According to the invention, data is transmitted by a sender to an authorized user coupled to a receiver while ensuring that the data remains unavailable to other users who are also coupled to the same receiver. The manner in which this is accomplished is described in detail below.

2. Example Environment

Before describing the invention in detail, it is useful to describe an example environment in which the invention can be implemented. In the broadest sense, the invention can be implemented in any data communication systems where multiple users are connected to a common receiving system, including a DBS service.

Figure 1:
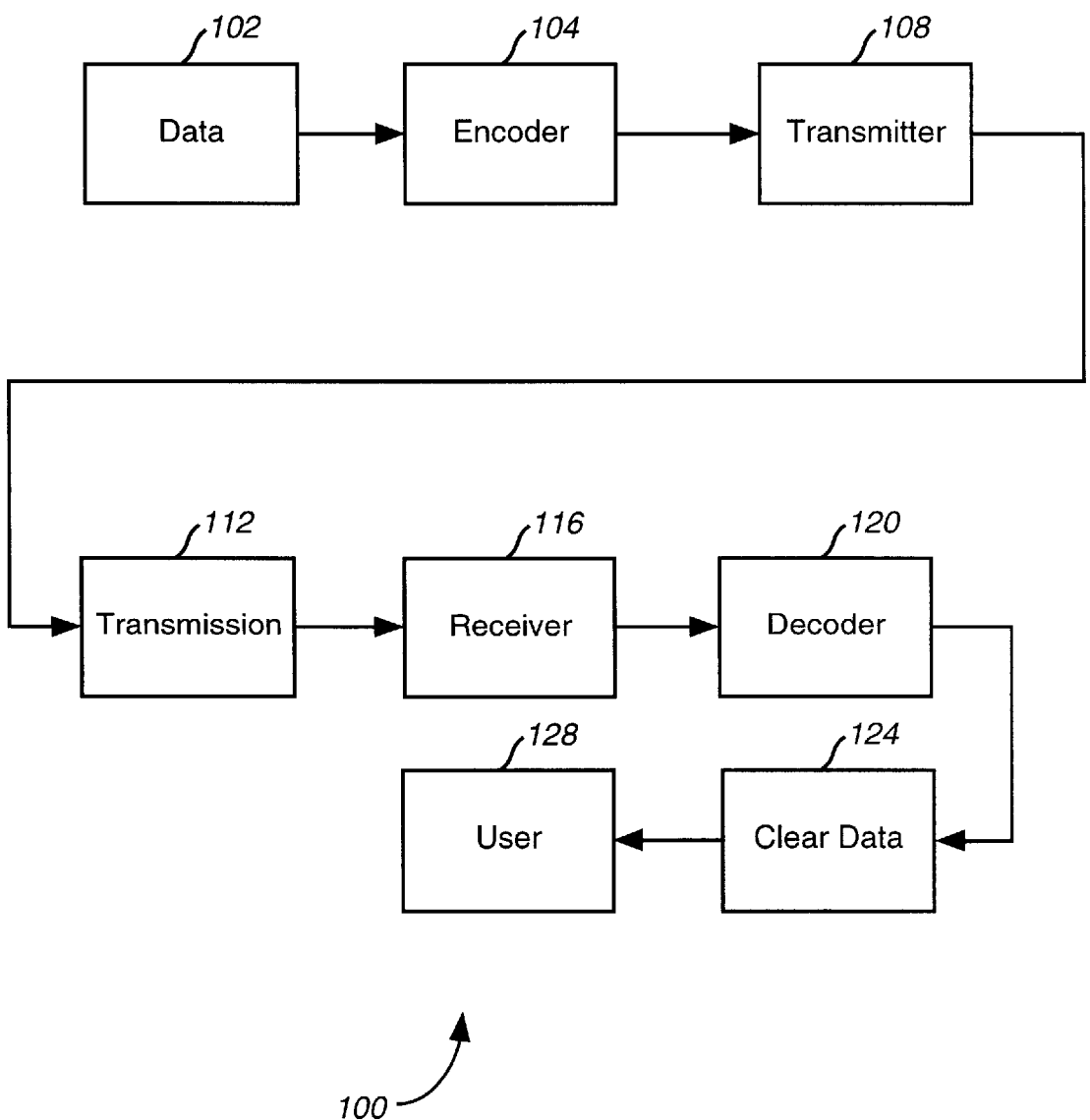
FIG. 1 is a block diagram illustrating a basic data communication system.

FIG. 1 is a block diagram illustrating a basic data communication system 100. The communication system 100 is comprised of data 102, an encoder 104, a transmitter 108, a transmission 112, a receiver 116, a decoder 120, clear data 124 and a user 128. The data 102 is scrambled or otherwise encoded at the encoder 104, and is thereafter transmitted by the transmitter 108. The transmission 112 may occur by means of satellite, land-line, microwave, internet or other transmission means. The transmitted data is received at the receiver 116, and is then descrambled or otherwise decoded by the decoder 120, wherein clear data 124 is provided to the user 128. In this environment where only one user 128 is coupled to the receiver 116, a single encoding scheme provides adequate security.

Increasingly, however, data communication systems have multiple users who are being connected to a common receiver. Where there are multiple users coupled to a common receiver, the single encoding scheme fails to provide adequate security, since all users, including the unauthorized users, may potentially gain access to the data, unless some means of restricting the data is implemented in the data transmission system. Thus, the sender runs the risk of losing revenue as unauthorized users may easily gain access to valuable data without having to subscribe to it.

Figure 2:
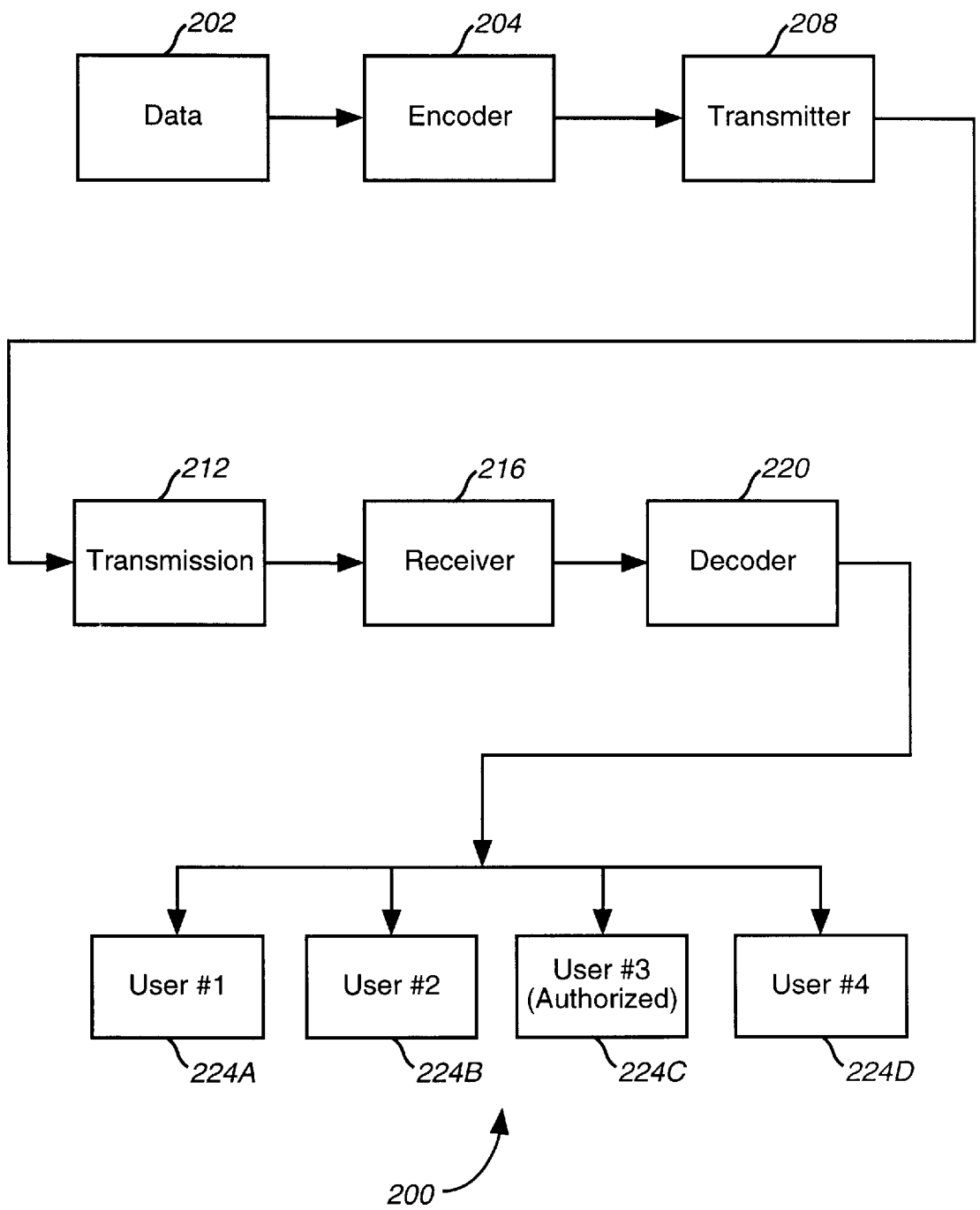
FIG. 2 is a block diagram illustrating the data communication system of FIG. 1, wherein multiple users are coupled to a common receiver.

The above described environment exists where a server grade computer is connected to a receiver which is connected to a satellite dish. The server usually has several personal computers connected to it. A similar environment also exists in other communication systems where several users are connected to a common receiving system. In such an environment, once the data is descrambled at the receiver, it is available to all users regardless of whether they are authorized to receive it. One such environment is illustrated in FIG. 2 which shows a block diagram of a data communication system 200 wherein multiple users are coupled to a common receiver. In the example illustrated in FIG. 2, the communication system 200 is comprised of data 202, an encoder 204, a transmitter 208, a transmission 212, a receiver 216, a decoder 220 and users 224A–224D. The transmission 212 may be any one of several common transmission means, including the DBS transmission.

The sender encodes the data 202 at the encoder 204, and transmits the encoded data using the transmitter 208. The transmitted data is received at the receiver 216, and is then decoded by the decoder 220. The receiver 216 is coupled, via the decoder 220, to the users 224A–224D. The users 224A–224D may be located in the same physical facilities as the receiver, or they may be distributed geographically. However, they all have access to the data received by the receiver 216.

The present invention is described in terms of this example environment. Description in these terms is provided for convenience only. It is not intended that the invention be limited to application in this environment. In fact, after reading the following description, it will become apparent to a person skilled in the relevant art how to implement the invention in alternative environments.

3. Present Invention

Figure 3:
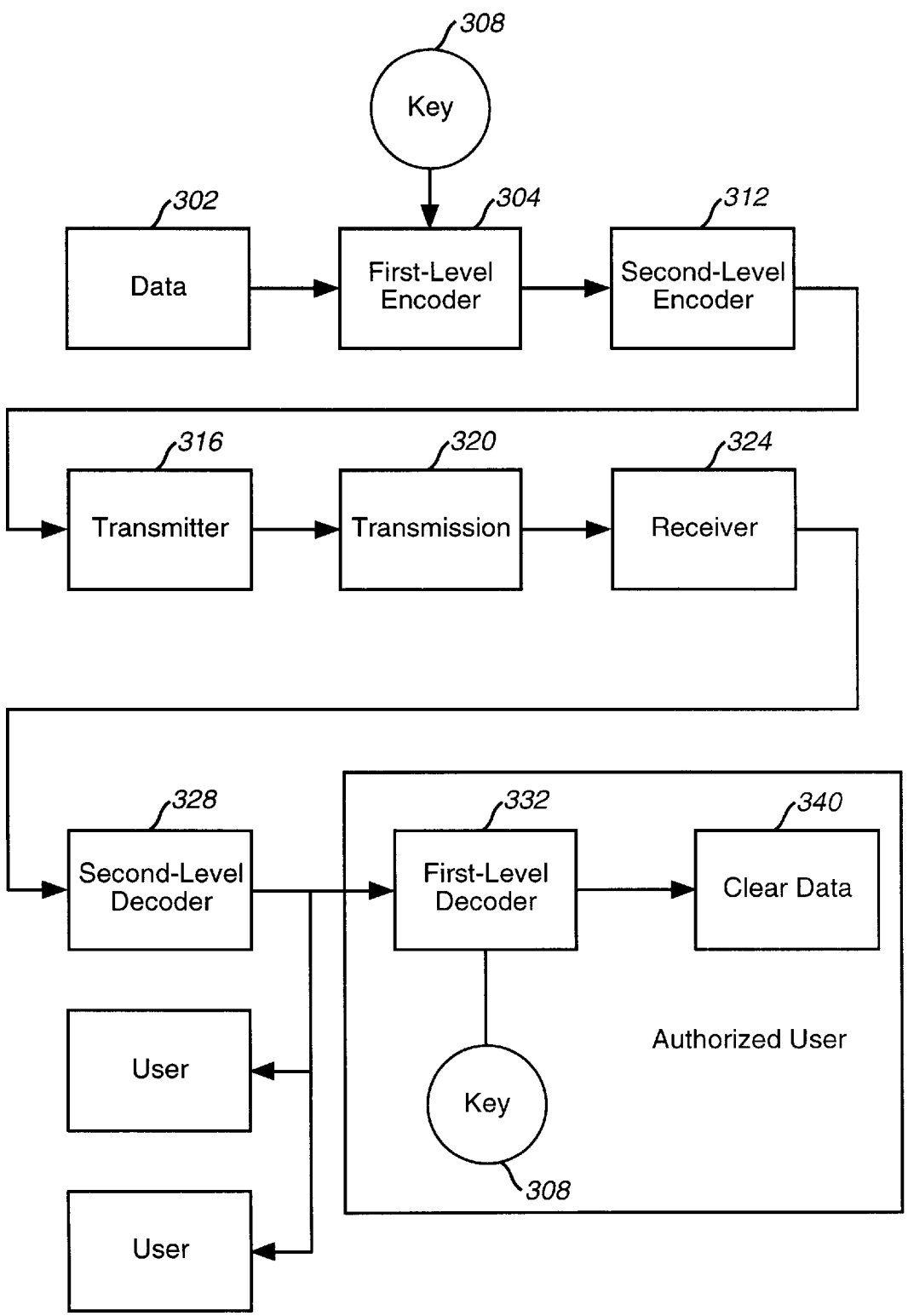
FIG. 3 is a block diagram illustrating the present invention according to one embodiment.

In the example illustrated in FIG. 2, if only user 224C is authorized to receive the data, security is compromised, as each of the other users 224 has access, via the receiver, to the data. The present invention provides a solution to this security problem. FIG. 3 is a block diagram generally illustrating the invention according to one embodiment. Specifically, this embodiment is comprised of data 302, a first-level encoder 304, key 308, a second-level encoder 312, a transmitter 316, a transmission 320, a receiver 324, a second-level decoder 328, a first-level decoder 332 and clear data 340.

Referring now to FIG. 3, a sender encrypts or otherwise encodes the data 302 at the first-level encoder 304 using the key 308. The first-level encoded data is then scrambled or otherwise encoded at a second-level encoder 312 using a second-level encoding scheme. The second-level encoded data is then transmitted using a transmitter 316. The transmitted data is received at a receiver 324 and is descrambled or otherwise decoded at a second level decoder 328 corresponding to the second-level encoding scheme.

Figure 4:
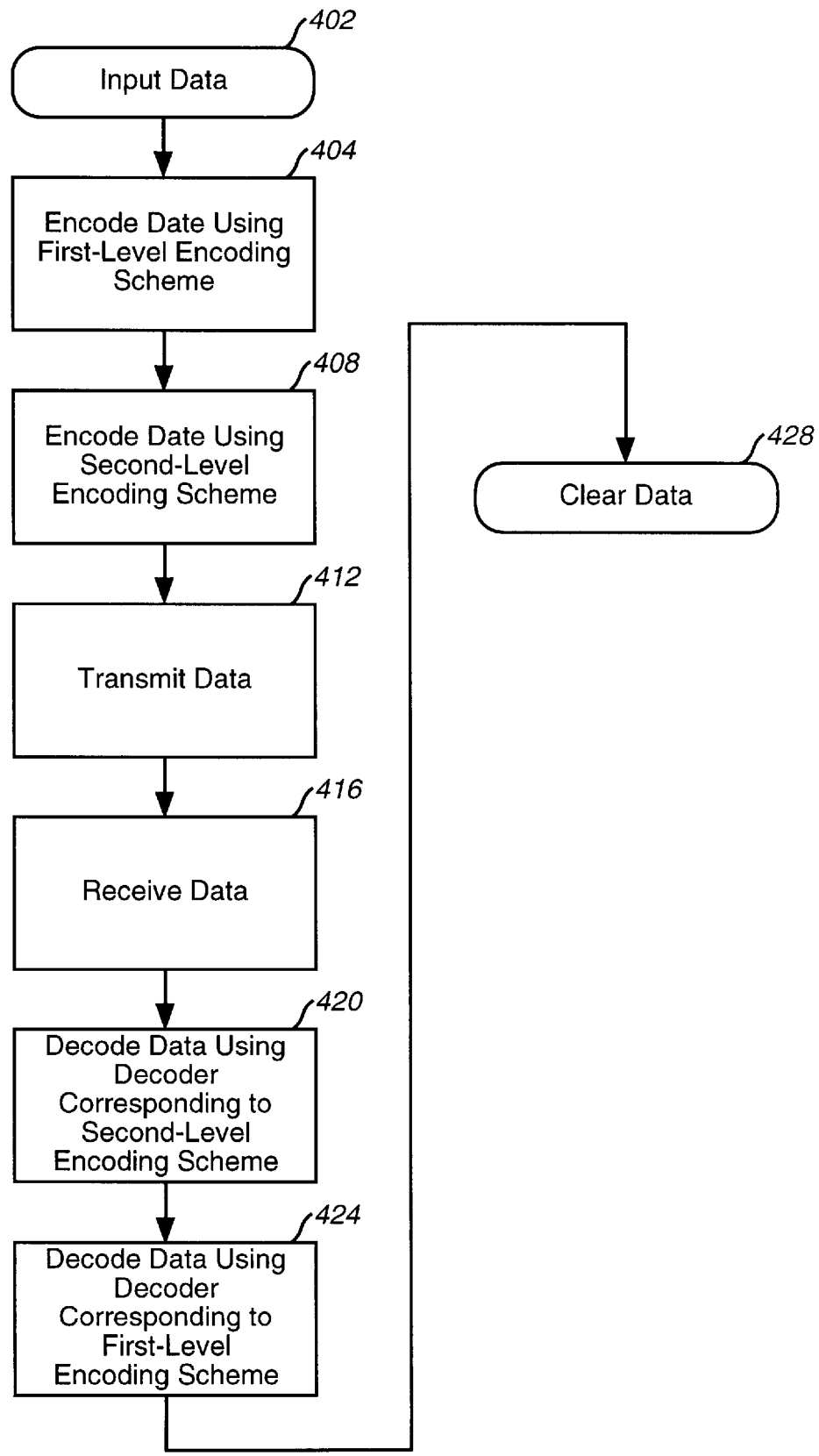
FIG. 4 is a flow diagram illustrating the steps involved in transmitting and receiving data according to one embodiment of the invention.

FIG. 4 is a flow diagram illustrating the steps involved in transmitting and receiving the data 302 in accordance with the embodiment of FIG. 3. Referring now to FIG. 4, the data 302 is shown in a step 402. In a step 404, the data 302 is encoded by the sender at the first-level encoder 304 using the first-level encoding scheme. In a step 408, the first-level encoded data is then encoded by the sender at the second-level encoder 312 using the second-level encoding scheme. In a step 412, the second-level encoded data is transmitted by the sender using the transmitter 316. In a step 416, the transmitted data is received at a receiver 324. In a step 420, the data is decoded at the second-level decoder 328.

Although all users coupled to the receiver 324 via the second-level decoder 328 may gain access to the second-level decoded data, the data is unreadable because it is still first-level encoded. An authorized user can decode the second-level decoded data at a first-level decoder 332 using the key 308 and obtain clear data 340. Thus, only the authorized user can receive the clear data 340 which is readable. Thus far, the system illustrated in FIG. 3 provides two levels of security. A first level of security is provided by encrypting the data 302 at the first-level encoder 304. A second level of security is provided by scrambling the data 302 at the second-level encoder 312. At the receiver end, the data is descrambled to provide the encrypted data, but users without the key 308 cannot decrypt the data. Only users with the key 308 can decrypt the data and read its content.

In a step 424, the authorized user decodes the second-level decoded data using a decoder 332 corresponding to the first-level encoding scheme and receives clear data 340 in a step 428. The step 424 comprises decrypting the second-level decoded data with the key 308.

The present invention illustrated in FIG. 3 can be easily implemented in the DBS system described, supra. At the receiver end of a DBS system, a satellite dish receives the transmission of the encrypted and scrambled data. The receiver descrambles the signal and provides a server with the data. However, the data is still encrypted and unreadable. The data is retrieved from the server by an authorized user. The authorized user has the proper key needed to decrypt the data. By providing the authorized user with the proper key, the DBS service provider ensures that only the authorized user will receive the clear data, but unauthorized users will not.

The method of encrypting the data and then scrambling it provides two levels of security which typically provides an adequate level of security in a data communication system in which multiple users are connected to a common receiving system. This level of security assures that only the user with the proper key 308 may be able to decrypt the data. However, in order to further secure the system and thus provide protection beyond the minimum required level, a third level of security can be implemented by encoding (for example, encrypting) the key 308 itself using an asymmetric encryption algorithm, and then transmitting the encrypted key to the authorized user. This third level of security will ensure that only the authorized user can have possession of the key 308, but not the other users.

Figure 5:
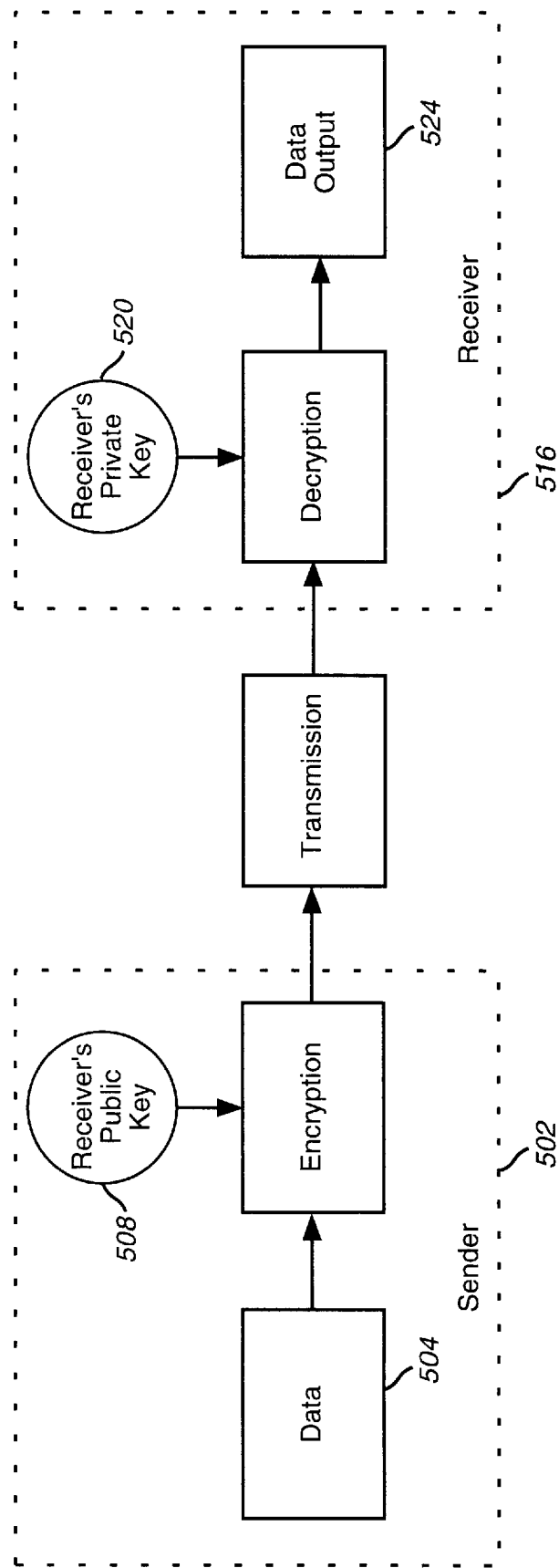
FIG. 5 is a block diagram illustrating a conventional method of asymmetric data encryption using a public and a private key.

FIG. 5 generally illustrates a conventional method of data encryption using an asymmetric encryption algorithm. An asymmetric algorithm is one in which one key is used to encrypt data, and a different key is used to decrypt it. Both keys are very specific to the particular encryption and decryption of the data, such that in order to decrypt the data with a second key, a specific first key must be used to encrypt the data. In this instance, the key that is used to encrypt the data is designated as a receiver's public key, in that it can be made available to anyone without compromising security. The key that is used to decrypt the data is designated as a receiver's private key which is not made available to anyone but the receiver. One teaching by which public keys for each receiver can be made available to the sender is by a Certificate Authority. The Certificate Authority is a network service available to all users of a system, such as the sender and receiver of the current example. It is a database of public keys that can be used by one user to encrypt data to send to another user.

Referring now to FIG. 5, a sender 502 encrypts data 504 using a receiver's public key 508. The encrypted data is transmitted and is thereafter received by the receiver 516. At the receiver 516, the encrypted data is decrypted using the receiver's private key 520.

Figure 6:
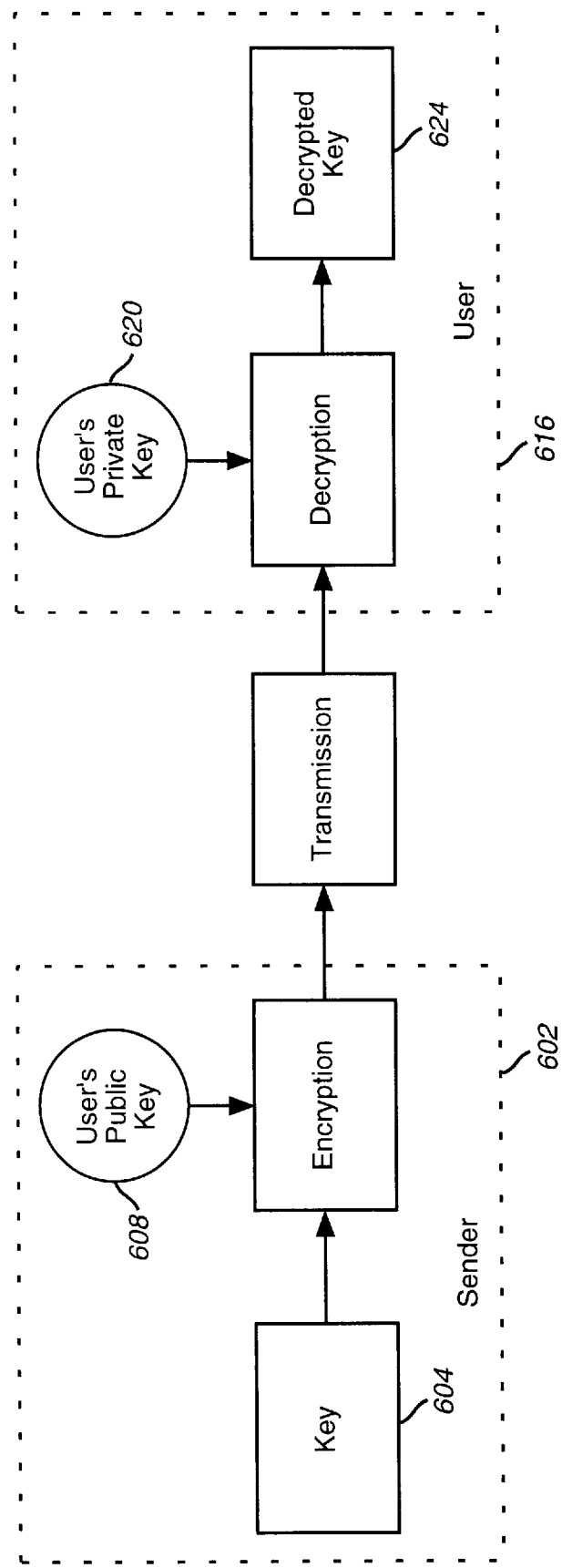
FIG. 6 is a block diagram illustrating the encryption method of FIG. 5 incorporated in the present invention.

FIG. 6 illustrates the encryption scheme of FIG. 5 incorporated in the present invention to provide a third level of security. The third level of security is provided in the way a key is sent to an authorized user. The key itself is encrypted using an asymmetric encryption algorithm. The authorized user is provided with the key via a secured method, and he or she can then use the key to decrypt the data. The scheme is comprised of a sender 602, a key 604, a decrypted key 624 a user's public key 608, a user 616 and a user's private key 620. Referring now to FIG. 6, the sender 602 encrypts the key 604 using the user's public key 608. The encrypted key is then transmitted and is ultimately received by the user 616. The user 616 decrypts the encrypted key by using the user's private key 620. The decrypted key 624 can then be used by the user to decrypt the encrypted data, also referred to as the first-level encoded data, of FIG. 3.

Where multiple users are coupled to a single receiving system, each will have their own private key 620 and their public key 608. In addition, the sender 602 will also have the users' public key 608 which is available through the Certificate Authority, for example. Any user connected to the receiver may receive the encrypted key, but only those authorized will be able to decrypt it with their private key 620. In a DBS system, this provides a convenient and an efficient method for the DBS service provider to provide authorization to select users served by a common receiving system.

Figure 7:
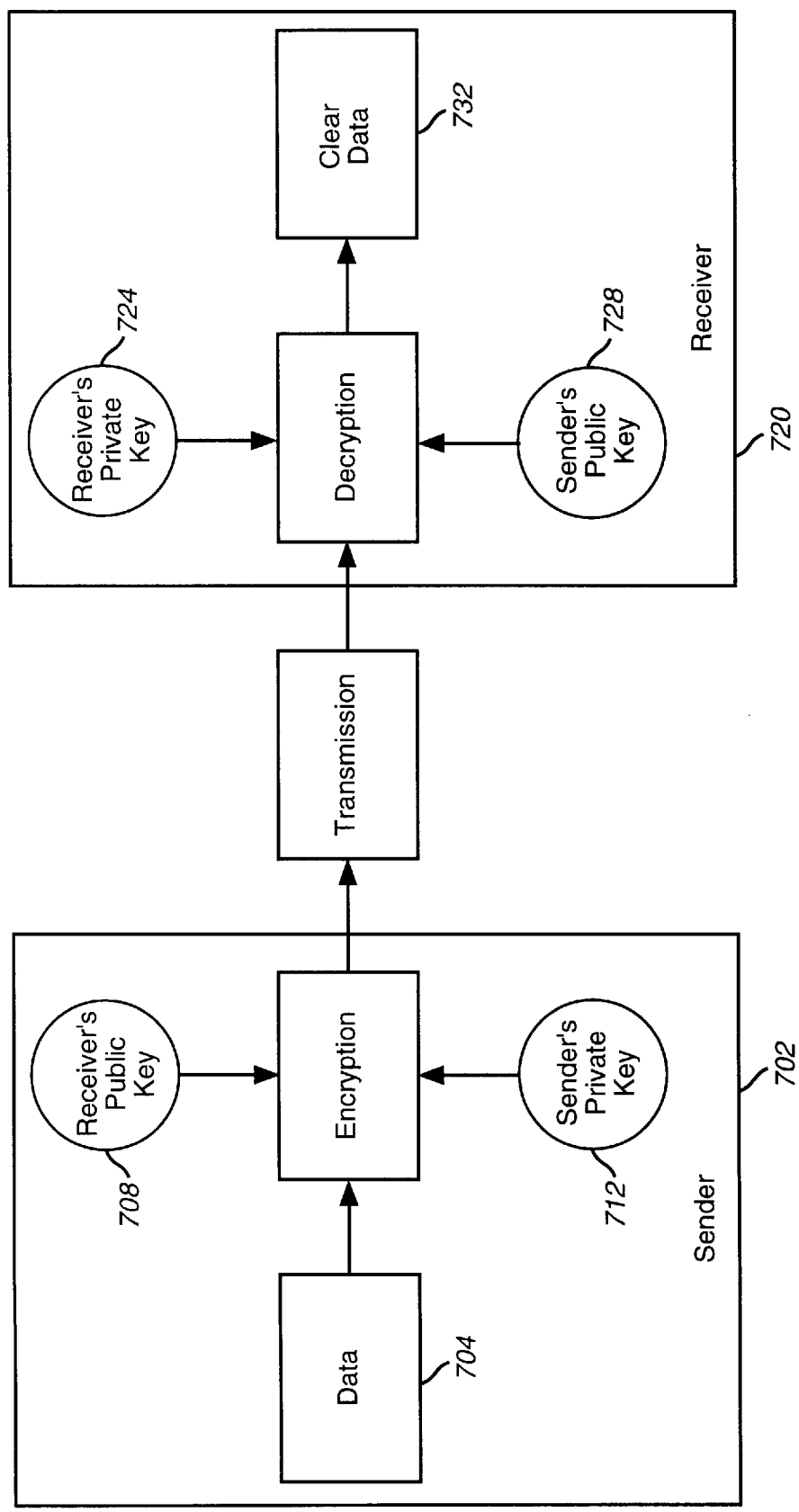
FIG. 7 is a block diagram illustrating another aspect of the conventional method of asymmetric data encryption of FIG. 5.

FIG. 7 illustrates another aspect of the conventional encryption scheme of FIG. 5, which provides both an additional layer of security and a unique signature of the sender. Specifically, FIG. 7 includes a sender 702, data 704, a receiver's public key 708, a sender's private key 712, a receiver 720, a receiver's private key 724, a sender's public key 728 and clear data 732. The sender 702 encrypts the data 704 using the receiver's public key 708 as before, but also using the sender's private key 712. The sender 702 transmits the encrypted data which is thereafter received by the receiver 720. The receiver 720 decrypts the data using the receiver's private key 724 and the sender's public key 728 to retrieve clear data 732.

Use of two keys for encryption and decryption provides the additional layer of security. It also provides a unique signature of the sender. Because the receiver 720 must decrypt the data with the specific sender's public key 728, the receiver 720 knows that the data was sent by that sender.

Figure 8:
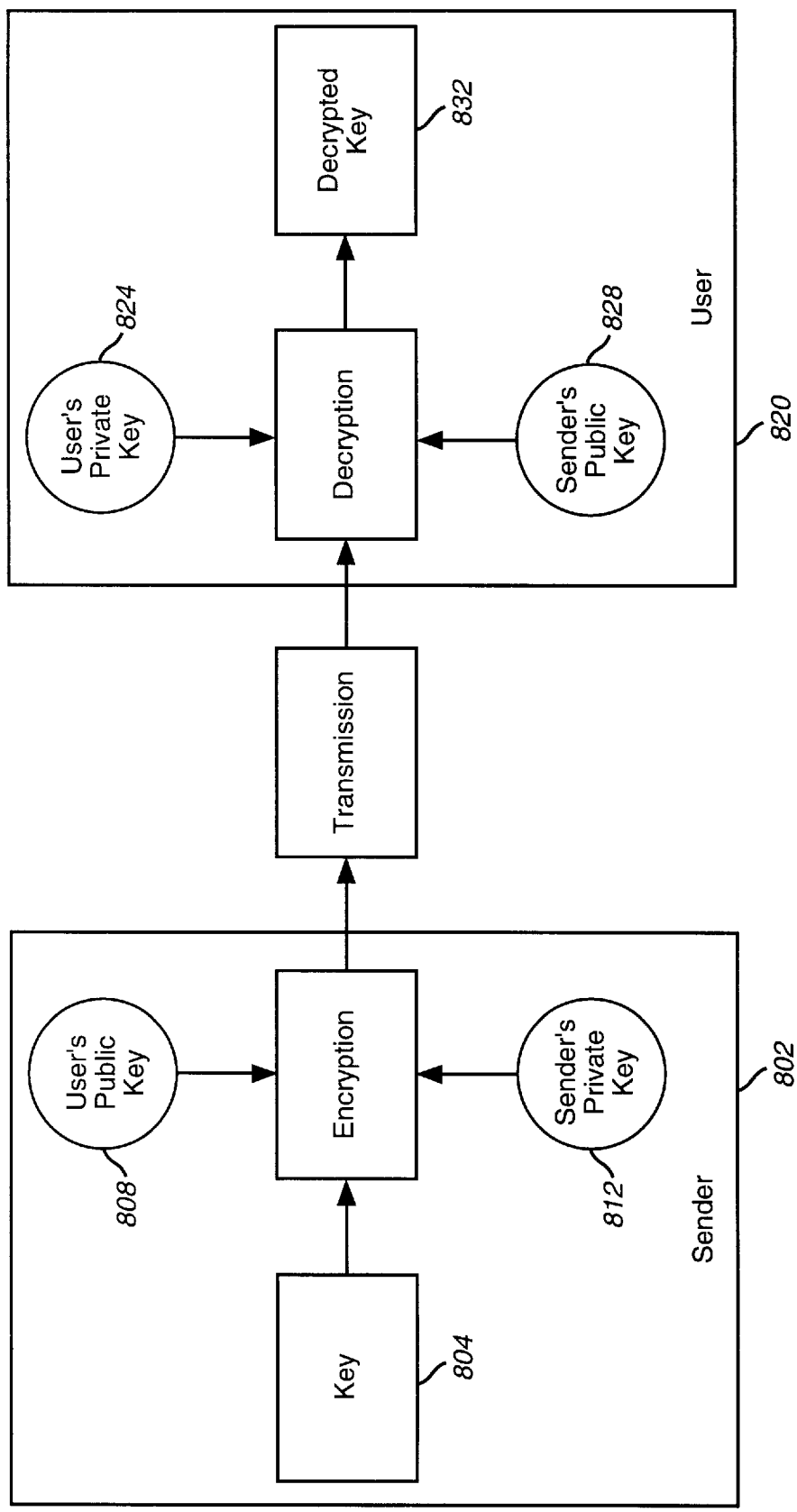
FIG. 8 is a block diagram illustrating the encryption method of FIG. 7 incorporated in the present invention.

FIG. 8 illustrates the encryption scheme of FIG. 7 incorporated in the present invention to provide a third level of security and also a unique signature of the sender. Specifically, FIG. 8 includes a sender 802, a key 804, a user's public key 808, a sender's private key 812, a user 820, a user's private key 824, a sender's public key 828 and a decrypted key 832. The sender 802 encrypts or otherwise encodes the key 804 using both the user's public key 808 and the sender's private key 812. The encrypted key is transmitted and is ultimately received by the user 820. The user 820 decrypts the encrypted key using the sender's public key 828 and the user's private key 824. The decrypted key 832 can then be used by the user 820 to decrypt the encrypted data of FIG. 3.

4. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method for providing security in a data transmission system where data is transmitted from a sender to an authorized user via a receiver, the authorized user being one of a plurality of users connected to the receiver, the method comprising the steps of:

encoding said data using a first-level encoding scheme;

encoding said first-level encoded data using a second-level encoding scheme; and transmitting said second-level encoded data;

wherein, as a result of encoding data using said first and second-level encoding scheme, only a user capable of decoding said first-level encoded data and connected to a receiver capable of decoding said second-level encoded data can access said transmitted data.

2. The method according to claim 1 wherein said first-level encoding scheme is an encryption scheme using a first key.

3. The method according to claim 2 wherein said first-level encoding scheme further comprises:

encrypting said first key using the authorized user's public key; and transmitting said encrypted first key to said receiver.

4. The method according to claim 2 wherein said first-level encoding scheme further comprises:

encrypting said first key using the authorized user's said public key and the sender's private key; and transmitting said first key to said receiver.

5. The method according to claim 1 wherein said second-level encoding scheme comprises scrambling said data using a signal scrambler.

6. The method according to claim 1 further comprising the steps of:

receiving said transmitted data at said receiver;

decoding said received data using a second-level decoding scheme; and the authorized user decoding said second-level decoded data using a first-level decoding scheme.

7. A method for providing security in a data transmission system where data is transmitted from a sender to an authorized user via a receiver, the authorized user being one of a plurality of users connected to said receiver, the method comprising the steps of:

receiving said data at said receiver;

decoding said data using a second-level decoding scheme wherein said data has been encoded using a second-level encoding scheme by the sender; and the authorized user decoding said data using a first-level decoding scheme wherein the data has been encoded using a first-level encoding scheme by the sender.

8. The method according to claim 7 wherein said first-level decoding scheme further includes:

receiving an encrypted first key that has been encrypted and transmitted by the sender;

decrypting said first key; and decrypting said data using said decrypted first key.

9. The method according to claim 8 wherein said encrypted first key is decrypted by the authorized user using the authorized user's private key.

10. The method according to claim 8 wherein said encrypted first key is decrypted by the authorized user using the authorized user's said private key and the sender's public key.

11. The method according to claim 7 wherein said second level decoding scheme at the receiver comprises scrambling the data using a signal scrambler.

12. A system for providing security in a data transmission system where data is transmitted from a sender to an authorized user via a receiver, the authorized user being one of a plurality of users connected to the receiver, comprising:

first-level encoder means for encoding said data using a first-level encoding scheme;

second-level encoder means, connected to said first-level encoder means, for encoding said first-level encoded data using a second-level encoding scheme; and transmitter means, connected to said second-level encoder means, for transmitting said second-level encoded data;

wherein, as a result of encoding data using said first and second-level encoding scheme, only a user capable of decoding said first-level encoded data and connected to a receiver capable of decoding said second-level encoded data can access said transmitted data.

13. The system according to claim 12 wherein said first-level encoder means is a means for encrypting data using a first key.

14. The system according to claim 13, wherein said first-level encoder means further comprises means for encrypting said first key using the authorized user's public key.

15. The system according to claim 13, wherein said first-level encoder means further comprises means for encrypting said first key using the authorized user's said public key and the sender's private key.

16. The system according to claim 12 wherein said second-level encoder means comprises a signal scrambler.

17. The system according to claim 12 further comprising:

receiver means for receiving said transmitted data;

second-level decoder means, connected to said receiver means, for decoding said received data; and first-level decoder means, connected to said second-level decoder means, for decoding said second-level decoded data.

18. An system for providing security in a data transmission system where data is transmitted from a sender to an authorized user via a receiver, the authorized user being one of a plurality of users connected to said receiver, comprising:

receiver means for receiving said data;

a second-level decoder means, connected to said receiver means, for decoding said data that has been encoded by the sender using a second-level encoder means; and first-level decoder means, connected to said second-level decoder means, for decoding said second-level decoded data that has been encoded by the sender using a first-level encoder means.

19. The system according to claim 18, wherein said first-level decoder means further includes:

means for decrypting a first-key that has been encrypted by the sender; and means for decrypting said data using said decrypted first key.

20. The system according to claim 19 wherein said means for decrypting said first key includes the authorized user's private key.

21. The system according to claim 19 wherein said means for decrypting said first key includes the authorized user's said private key and the sender's public key.

22. The system according to claim 18 wherein said second-level decoder means is a signal scrambler.

* * * * *